W. M. MORDEY, J. W. ASTLEY & D. B. SAUNDERSON.
CONDUCTOR SUPPORT.
APPLICATION FILED DEC. 9, 1913.
1,153,813.
Patented Sept. 14, 1915.
5 SHEETS—SHEET 1.
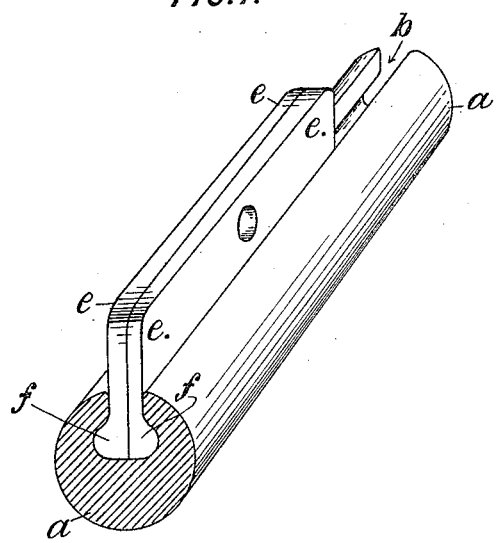
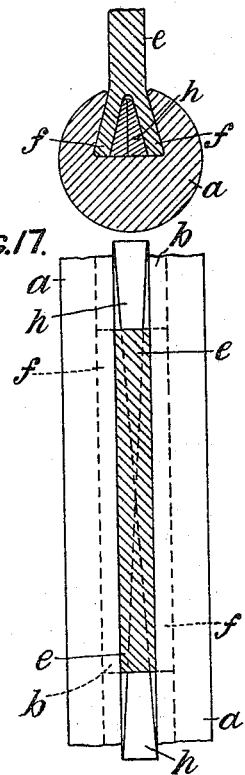

W. M. MORDEY, J. W. ASTLEY & D. B. SAUNDERSON.
CONDUCTOR SUPPORT.
APPLICATION FILED DEC. 9, 1913.
1,153,813.
Patented Sept. 14, 1915.
5 SHEETS—SHEET 2.
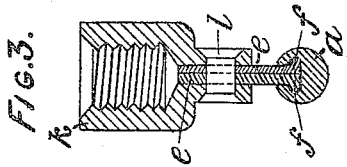
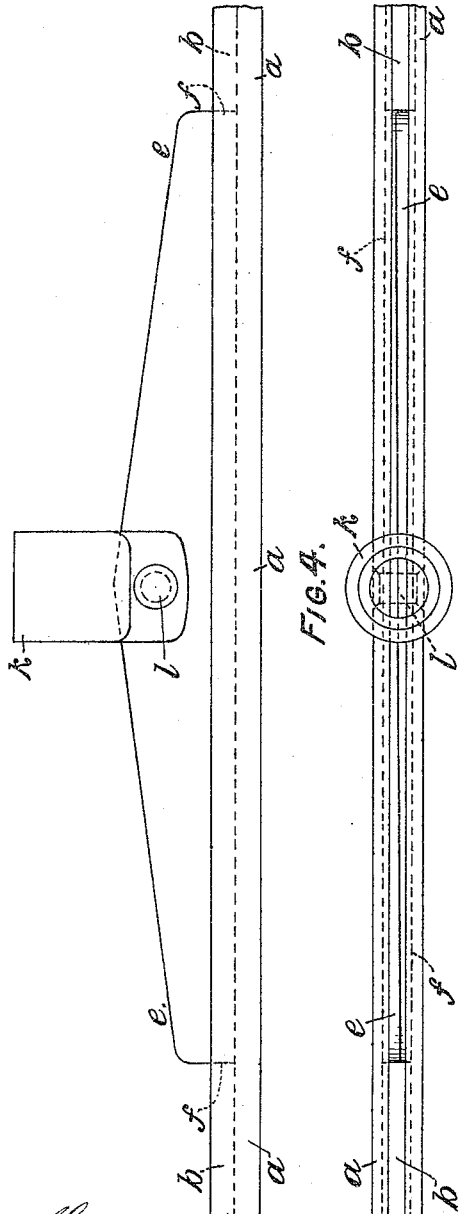

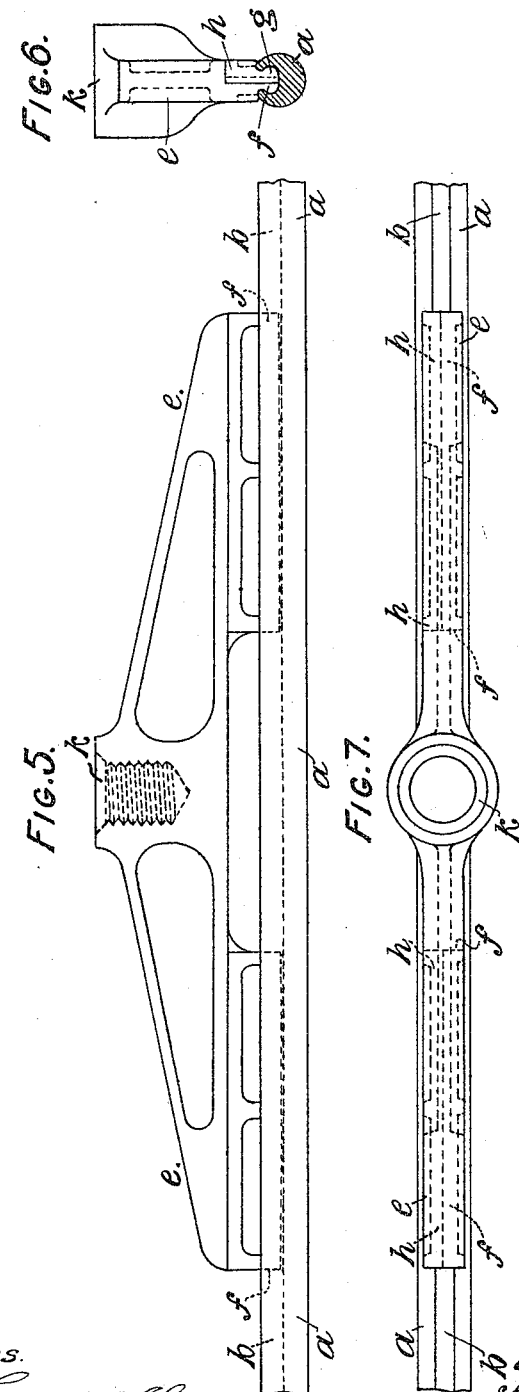

W. M. MORDEY, J. W. ASTLEY & D. B. SAUNDERSON.
CONDUCTOR SUPPORT.
APPLICATION FILED DEC. 9, 1913.
1,153,813.
Patented Sept. 14, 1915.
5 SHEETS—SHEET 4.
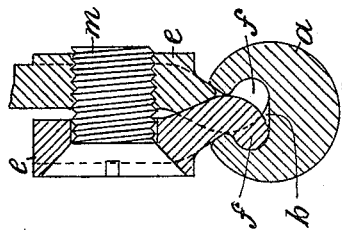
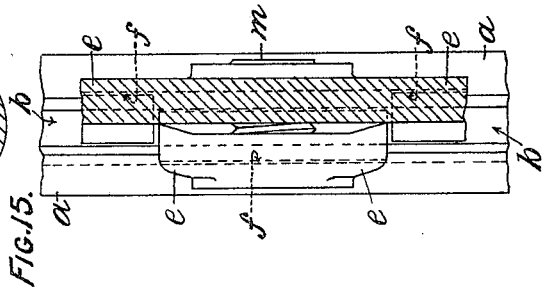
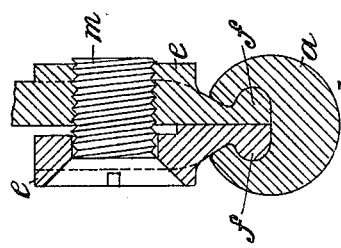
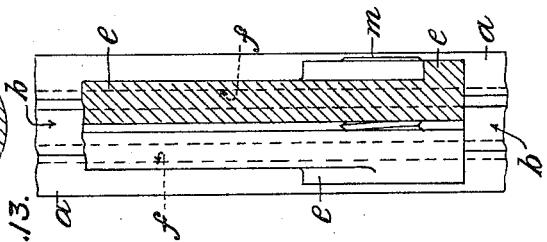
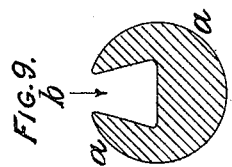
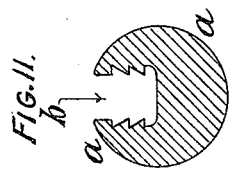
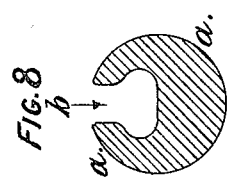
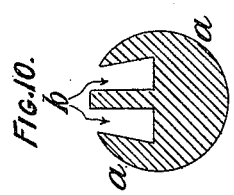
Witnesses
Floyd R. Cornwall
Inventors
W. M. Mordey
J. W. Astley
D. B. Saunderson.
By Atty W. M. MORDEY, J. W. ASTLEY & D. B. SAUNDERSON.
CONDUCTOR SUPPORT.
APPLICATION FILED DEC. 9, 1913.
1,153,813.
Patented Sept. 14, 1915.
5 SHEETS—SHEET 5.
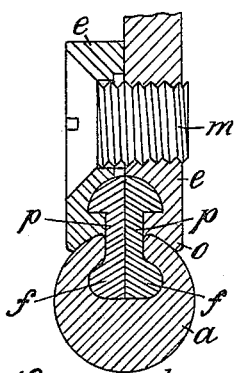
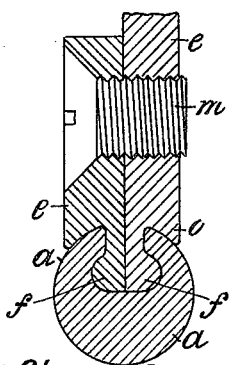
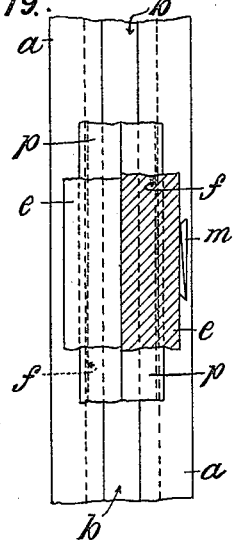
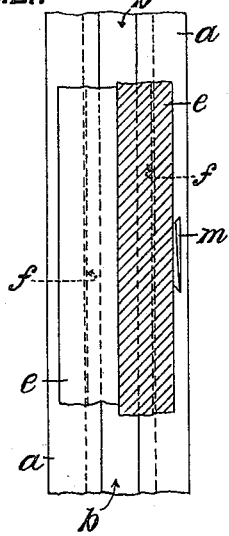
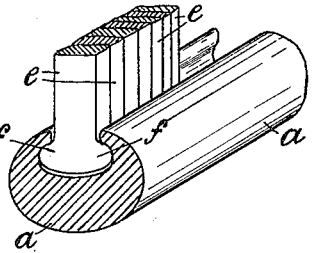
Witnesses
Inventors
W. M. Mordey
J. W. Astley
D. B. Saunderson.
By Atty.

UNITED STATES PATENT OFFICE.

WILLIAM MORRIS MORDEY, OF WESTMINSTER, LONDON, AND JOHN WILLIAM ASTLEY AND DOUGLAS BRYCE SAUNDERSON, OF PRESCOT, ENGLAND.

CONDUCTOR-SUPPORT.

1,153,813.

Specification of Letters Patent.

Patented Sept. 14, 1915.

Application filed December 9, 1913. Serial No. 805,591.

*To all whom it may concern:*

Be it known that we, WILLIAM MORRIS MORDEY, residing at 82 Victoria street, Grosvenor Mansions, Westminster, London, in the county of Middlesex, United Kingdom of Great Britain, and JOHN WILLIAM ASTLEY and DOUGLAS BRYCE SAUNDERSON, residing at Prescot, in the county of Lancaster, United Kingdom of Great Britain, subjects of the King of England, have invented new and useful Improvements in and Connected with Conductor-Supports, of which the following is a specification.

This invention has reference to electrical conductors and to the mode or means for carrying them; and has special reference to conductors used to supply current to electrically propelled vehicles, wherein they are suspended from the carriers, generally called "ears", above them; and it has primarily for its object and effects to provide a conductor, and means for supporting or suspending, which are generally advantageous in connection with such electrical work; and especially in cases where the trolley wheel or collector through which current is passed from the conductor to the vehicle motor, presses and runs on the under-surface of the conductor, such as in the case of ordinary street or road electrical traction systems, having an overhead arrangement of supply conductors, which are supported from point to point, in the straight, and round curves, and are fitted with frogs and crossing fittings; in which case the primary object of the invention is—that the wear on the trolleys or collectors, and upon the wire, shall be diminished, and the conductor shall not have the tendency due to the action of the trolley on it, to turn upon its axis, especially at curves—with its known attendant defects; that the wire shall remain in its normal condition or state without such tendency; and that it shall, at the same time, offer a more complete and uniform contact surface. While a further object is to provide a conductor and carrier, by which the trolley or collector shall not foul the carrier or ears, even after it—the trolley—has become much worn; and, also the conductor shall be capable of being readily and quickly fitted to or connected up with frogs, crossings, and ears, etcetera, and shall be capable of being applied to and used, in some cases in connection with the present fittings or means of suspension.

The conductor has a single groove, or a plurality of grooves close to one another, and the supporting or suspending ear or means consist of plates, bars or devices which fit into the groove or grooves and engage with the inside surfaces thereof, and are of substantially less width than the conductor, the sides of which extend a substantial amount beyond the sides or cheeks of the car or suspending device. The conductor in most cases is cylindrical in cross section or approximately so, and in the complete state, the invention provides such an absolutely non-fouling and readily attachable equipment or fitting that the pulley or collector, when much worn, cannot foul the supporting means.

In this system and arrangement, the groove or grooves in suspended systems, would, when fitted, be at the upper part of the conductor.

The mode of attachment of the conductor to the suspending means is accomplished by forming the conductor with a groove or grooves which is or are of different widths at different points between the outside surface of the conductor and the bottom or the side or sides of the groove or grooves, or one side of the groove is inclined in relation to the vertical plane, so that the suspending fitting mechanically engages with the interior part of the groove or grooves and the wire will hang therefrom or be supported thereby. In some cases the groove or grooves is so formed, or the metal on each side of it is so shaped, that after the suspending means is introduced into the groove, the metal is pressed or forced over parts of the suspending devices.

As a modification, the groove or grooves, or a part or parts of the suspending means, may have parallel or diverging sides, and may be serrated or roughened, or irregular in form; and the engagement of the sides of the groove or grooves with the said part or parts may be effected by a wedge interposed between the parts or by pressing the upper part of the conductor inward; while in other cases, in addition, readily fusible metal is introduced between the surfaces; or the supporting or suspending means is secured in the groove or grooves by means of a readily fusible metal or solder.

The conductor is of cylindrical or other form in cross section and where the conductor is made, and the groove formed by drawing through dies, the groove is carried or extends deeply into the conductor say near to, or up to, or slightly beyond its axis, so that it is supported and held along the axis or in the horizontal plane extending through the axis, or near it.

Referring to the drawings:—Figure 1 is a diagrammatic perspective view illustrating a conductor with its supporting mechanical engaging means fitted into its groove, and engaging with the internal surfaces or parts of the groove; and Figs. 2, 3, and 4 are side elevation, cross section, and plan respectively of this conductor, and its supporting or carrying fitting, wherein the form of such fitting is of the character illustrated and set forth with reference to Fig. 1; and in Figs. 5, 6, and 7 which are side elevation, plan, and cross section respectively, a modified construction of carrier parts complete are given. Figs. 8 to 11 illustrate to an enlarged scale, the wire or conductor according to this invention, in several different modified forms. Figs. 12 to 22 show in cross section and plan, various modified forms of suspending or carrier means used in connection with the improved wire hereunder.

In the drawings, the wire or conductor throughout is designated $a$, and the groove or grooves $b$; while the suspending plate device or ear is generally designated $e$.

The wires $a$ in the cases shown in Figs. 1 to 7 are of the form generally of the wire shown to an enlarged scale in Fig. 8; in which the inner part of the groove is wider than the outer part of it; and the parts of the suspender or ear which fit within this groove are of corresponding form, so that the support is effected by the metal of the sides of the groove of the wire which project inward, and fit over and engage the larger or wider parts of the portion of the suspender which fits in the groove.

In the case shown in Figs. 1 to 7, the groove is comparatively narrow nearest the outside portion, and from this narrow portion or neck, extends suddenly out into a curved groove; in this, as in each case, the groove is extended down near to the horizontal axis of the wire.

With regard to the suspender or ear shown in Figs. 1 to 4, it is made in halves, consisting of two plates; the two half plates, including the lower large parts $f$ which fit within the groove of the wire, being identical; and in fitting they are slid longitudinally in relation to each other until they lie truly side by side within the groove, and press upon its internal surfaces, and engage it. In this case, the suspending socket $k$ is separate from the plates $e$, and is formed at its lower part with a jaw which fits over the two plates at the center, and is connected with them by a pin $l$, which forms a hinge, about which the plates are free to rock.

It will be seen that in the arrangement shown in Figs. 1 to 4, the inside adjacent surfaces of the plates $e$ are oblique to the general vertical plane of the plates, and the inclines are disposed in opposite directions, so that the two plates constitute wedges, and when pressed toward one another, cause them to move on to and engage firmly, the inside surfaces of the groove of the wire.

Regarding the form of suspending device or ear shown in Figs. 5 to 7, and the mode of fitting and fixing the parts of it which fit within the groove $b$ of the wire, the suspender or ear proper, has at each end, a part lying to one side, roughly, of the general central plane of the ear; and each part has a bulb or outwardly projecting part or toe $f$ on its lower edge, of a form corresponding with and adapted to engage with the side of the groove $b$ of the wire $a$; and on the other side there is fitted a movable wedge piece $h$ with a half bulb $g$ on it, which together with the projection or half bulb $f$ fills the groove of the wire.

To introduce the suspender into the groove, the wire is fitted over the parts $f$ first, and then the wedge parts $h$ are introduced at a point of the groove beyond the parts $f$ in the longitudinal direction, and then slid along the groove, and so their inner surface comes up against the inner surface of the parts $f$, and so both sides of the groove are engaged by the suspending device. In these Figs. 5 to 7, the inner surface of these parts $f$ and $h$ are inclined as seen in the plan in Fig. 7, so that they are wedge shaped; and when they are pressed up against the parts $f$ of the suspender outward, they press the two bulb portions $g$ and $f$ on to the interior surface of the groove $b$, and engage it firmly. The inclines of the wedges and permanent parts are arranged so that the wedges in fitting them, are pressed outward in the longitudinal direction from the center of the ear; and the wedges may be made sufficiently long that, when home, their ends may be bent over.

In the constructions described and shown, where the conductor is made and the groove formed by drawing through dies, the groove is carried or extends deeply down into the conductor say near to, or up to, or slightly beyond its axis, so that it is supported and held along the axis in the horizontal plane extending through the axis, or near it.

In the modification shown in Figs. 12 and 13, the plates e themselves are made thinner; and where the screw m passes through them, they are provided with bosses as shown, and a space exists between the two plates from a point below the screw to the upper edge of this plate, so that when the screw m is screwed up, the tendency is that the two engaging bulbous projecting parts f of the device, will be canted or rocked outward into the bulbous groove of the wire.

Figs. 14 and 15—which are section and plan—show an arrangement where the two parts of the suspender are adapted to be rocked together in securing the wire. In this case, one overhanging edge of the groove b of the wire forms a buttress to the back of each rocking part or device; and when rocked, will force the toe f of same into the rooms at the other side of the groove; and these two parts are clamped and held together by the screw m, as in Figs. 12 and 13, so that they will engage the conductor equally, and furnish an equal support on each side of the vertical plane, and produce a firm and secure suspension and holding of the conductor. The left hand or shallower plate part e in this construction, is of short length, and lies between the two end portions of the other and longer plate which is gapped out at the center and lower parts, where the engaging part f comes, and so allows of the entry of the part f of the other plate.

In the modification shown in Figs. 16 and 17, the wire has the A shaped groove, and the suspender device above the wire is in one piece; while the part of it which fits within the groove, is split, and the two divided portions are pressed apart and into engagement with the sides of the metal forming the groove of the wire, by wedges h of a V shaped cross-section. Or alternatively, the wedges may be put longitudinally, and when pressed up from each end, will be side by side.

In the modification of Figs. 1 to 7 shown in Figs. 20 and 21, which are cross section and plan, the wire a is of the section given in Fig. 8 on Sheet 3, the groove being generally of the form of the lower part of a double bulb railway rail; and the suspending plates e are relatively thick, and the lower outer portions o form outer supporting flanges to the overhanging parts of the wire, the outside of the plates being flush with the outside of these parts o; and the two plates when moved into position, are fastened together by a screw m. One of the plates e in this case is shallow, and the other one will be extended upward, and provided with a suitable suspending socket or device, say similar to k.

In some cases, it is desired to retain the ears or suspending fittings of the outward clamping type in existing overhead electrical traction systems; and in such a case, a special intermediate supporting bar or means, adapted to fit in the groove or grooves of the conductor of the form herein described, is employed. Such a fitting is illustrated in plan and cross section in Figs. 18 and 19 in which e represents the existing overhead clamping suspending fittings, and p the special intermediate supporting bar, which will preferably be of the length of the suspending fittings. This intermediate suspending bar is made in two parts, adapted to be placed in position by sliding them longitudinally, in the groove of the wire after being separately inserted; and their upper part will be provided with a bulge or rib, corresponding with the form of the internal gripping portions of the suspended fitting; while the lower parts will be also of bulbous formation, corresponding with the form of the groove of the wire used, namely, similar to the parts f of the fittings or ears described with reference to the modifications previously referred to; and it will be understood in this connection, that the formation and manner of attaching the intermediate supporting bar with the wire a may be effected in any of the manners above described.

According to a modification illustrated in Fig. 22, in perspective, the enlarged mechanical engaging parts e, f, of the supporting or suspending device are made up in a plurality of relatively thin pieces of metal, which say are cut or stamped out of a plate, or cast, and having enlarged engaging parts f at their lower ends, which correspond to a large degree, or wholly, with the internal enlarged inner portion of the groove of the wire. These stampings or castings can be inserted into the internal enlarged portion of the groove of the wire by turning them so that their surfaces are parallel with the opening of the groove, and then they can be passed down into it (they being made say, just less in thickness than the width of the opening in the groove); and by turning them around, they will assume the position given in the figure when they will engage with the groove; and when so inserted and turned and move up together, they can be clamped or bolted or held together in any suitable way, as for instance by a clamp, or an ear fitting in which their upper ends can be fitted and held. In this case, as in others, projecting portions as o shown in Figs. 18 and 19, can be provided on the pieces or plates e, or some of them, which overlap the metal at the mouth of the groove, and serve to reinforce or support this portion of the wire. In the section of wire given in this Fig. 22, the section of the wire is not truly cylindrical, that is, it is slightly elliptical, having its major axis lying in the horizontal plane.

As regards the particular forms of grooves employed, and the manner of connecting the conductor with the suspending ear or device adopted, these will depend in a substantial measure on the requirements of each case, or the conditions of application, such as the size of the conductor and parts, and other special characteristics of the condition of this application.

Regarding the different forms of groove used in the conductor, several modifications are shown in Figs. 8 to 11 indicating the directions in which the form of groove may differ, and of which the several modifications are types.

Fig. 8 shows a section of wire having a groove of the form substantially as shown in Figs. 1 to 7, and others; while the form of grooves shown in Fig. 9 is that of the wire shown in Figs. 16 and 17.

Fig. 10 shows a wire having two grooves wider at the inner, than their outer part, and adapted to receive the engaging ends or edges of the suspending device of corresponding form. These engaging edges will be introduced into the grooves at parts which will be parallel or enlarged, so as to permit of being so introduced; or by having the ends of the engaging parts of a width so they can be inserted into the narrow outside opening or neck of the grooves, and forcing their outer engaging surfaces on to the outside surfaces of the grooves, by wedges. Or, the grooves may be of equal width throughout, and when the engaging parts $f$ of the suspenders are introduced, the parts of the metal forming the outside of the grooves, are forced over on to the engaging inclined surfaces of the suspending parts.

The wire shown in Fig. 11 has a groove of the type of that in Fig. 13, but with the overhanging portions in multiple, and having a ribbed overhanging ledge formation. But instead of being angular as shown, they might be of corrugated form or multiple bulbous form.

As above stated, the invention provides an overhead conductor gear which, while it provides for being readily attached and fitted up when a trolley wheel is used as the collector, it cannot foul the supporting means or ears or device, even when it is very much worn; while the conductor itself is easily manufactured, and presents a more complete and uniform contact surface to the collector, and affords all the admitted known advantages incidental to, or furnished by a round or cylindrical conductor. Furthermore, it is more easily fitted at the frogs and crossings than the ordinary externally grooved conductors, and it is capable of being used in connection with the present fittings, in cases where cylindrical wire or conductors are now used, without material alteration.

While the invention has been mainly described as applied to systems in which the conductor is suspended, it may be applied in cases where suitable, when the conductor is supported vertically from below, or horizontally from the side.

What is claimed is:—

1. In electrical conductor supports, the combination of a solid substantially cylindrical wire, with a continuous deep groove, having a relatively large inside portion; a supporting device having a part which lies within the groove, adapted to be entered through the opening of the groove; and means for holding said part in engagement with the groove, adapted also to be entered through the opening of the groove; substantially as set forth.

2. In electrical conductor supports, the combination of a solid substantially cylindrical wire with a continuous deep groove; a supporting device having a part which lies within the groove, adapted to be entered through the opening of the groove, and a wedge device adapted to be entered through this opening of the groove, and when moved so as to engage the former part of the supporting device, holds the same in position in the groove; substantially as set forth.

3. In electrical conductor supports, the combination of a solid substantially cylindrical wire with a continuous deep groove; a supporting device having a part which lies within the groove, and a means comprising elongated plates adapted to enter the groove, having their outside surfaces parallel, and wedge shaped on the inside, and adapted at the part in the groove to engage the sides of the same; substantially as set forth.

4. An overhead electrical conductor adapted to be suspended at intervals, of solid practically cylindrical form, having a deep groove in one side or part of it, extending to about the axis of the conductor, and a part within it of greater width than another part at a greater radial distance from the center of the conductor; substantially as set forth.

5. Electrical conductor supports comprising a conductor of practically cylindrical form, having a deep groove in one side or part of it, with a relatively large inside portion; and supporting devices of plate form in two parts, the engaging edge of which is of less width than the narrowest part of the groove of the conductor; said plates when suspending the conductor being parallel, side by side, and their lower engaging edges together practically filling the groove; substantially as set forth.

6. In electrical conductor supports, a substantially cylindrical solid wire with a continuous deep groove; and twin plate readily attachable and detachably suspender devices, spaced at intervals, and the part of the same, which lies in the groove, being engaged by the metal of the sides of the groove; substantially as described.

7. In electrical conductor supports, a solid substantially cylindrical conductor having a continuous groove with a relatively large inside portion in one part of the groove; and a suspender device comprising two parts, parts of which mechanically engage with the internal part of the groove, and the mechanical engagement being adapted to be effected by the movement of the two parts of the supporting means in relation to each other, substantially as set forth.

8. In electrical conductor supports, a conductor having a groove with interior walls in one part of it; and a fitting comprising two parts which are movable relatively to each other, and are mechanically engaged with the interior walls of the groove, the mechanical engagement being effected by the relative movement of the two parts; substantially as described.

In testimony whereof we have signed our names to this specification in the presence of two subscribing witnesses.

WILLIAM MORRIS MORDEY.
JOHN WILLIAM ASTLEY.
DOUGLAS BRYCE SAUNDERSON.

Witnesses to the signature of William Morris Mordey:
S. J. EARL,
D. M. COODE.

Witnesses to the signatures of John William Astley and Douglas Bryce Saunderson:
SOMERVILLE GOODALL,
HARRY KEIGHTLEY.

Copies of this patent may be obtained for five cents each, by addressing the "Commissioner of Patents, Washington, D. C."